United States Patent [19]
Keller et al.

[11] Patent Number: 5,826,650
[45] Date of Patent: Oct. 27, 1998

[54] DEVICES AND METHODS FOR UTILIZATION OF INTERMITTENTLY AVAILABLE ELECTRIC ENERGY FOR HEATING AND COOLING OF HABITABLE STRUCTURES

[76] Inventors: Leonard J. Keller, 1501 N. Cedar St., Bonham, Tex. 75418; Austin N. Stanton, deceased, late of Bonham, Tex.; by Lina Mae Maddox, executor, 14120 Kleberg Rd., Dallas, Tex. 75253-5301

[21] Appl. No.: 942,535

[22] Filed: Oct. 2, 1997

[51] Int. Cl.$^6$ ...................................................... F25B 29/00
[52] U.S. Cl. ........................ 165/236; 126/620; 126/633; 165/48.1; 165/48.2; 165/97; 52/302.4; 52/302.3; 52/405.1; 392/343; 392/346
[58] Field of Search .................................. 165/236, 48.1, 165/48.2, 97; 126/617, 620, 633; 52/302.4, 302.3, 405.1; 392/343, 346

[56] References Cited

U.S. PATENT DOCUMENTS

| | | | |
|---|---|---|---|
| 4,006,856 | 2/1977 | Nilsson | 126/633 |
| 4,250,885 | 2/1981 | Van Heel | 126/620 |
| 4,286,420 | 9/1981 | Pharmakidis | 126/633 |
| 4,295,415 | 10/1981 | Schneider, Jr. | 52/405.1 |
| 4,304,219 | 12/1981 | Currie | 126/620 |
| 4,393,861 | 7/1983 | Beard et al. | 52/302.4 |
| 4,526,225 | 7/1985 | Stanton | 165/104.11 |
| 5,121,789 | 6/1992 | Scharfe | 165/48.2 |

*Primary Examiner*—John K. Ford
*Attorney, Agent, or Firm*—Geoffrey A. Mantooth

[57] ABSTRACT

Low-cost off-peak electric energy or electric energy from natural energy sources is used for heating of cooling of system air, which is moved in a closed circuit to heat or cool the energy storage medium of permeable concrete and sized gravel in the exterior walls of the structures. The heated or cooled system air is pressurized by a blower, and is moved horizontally outward through the energy storage medium, to store energy therein, as heat or cold. When stored heat or cold is required inside the structure, system air is moved horizontally, inward, through the energy storage medium, and is heated or cooled thereby, thus moving heat or cold to the material forming the interior surfaces of the exterior walls. Those surfaces then provide radiant heat transfer and convection heat transfer, with materials of the interiors of the structure, and with contents and occupants thereof. The energy storage walls are constructed of large energy storage blocks, lapped for added strength. The energy storage blocks are made of permeable concrete using the standard three-block concrete block producing machines and special block molds. Manifold tubes incased in cap beams on top of the walls distribute system air uniformly to block walls, and return it in closed circuit. Heating and cooling of the energy storage medium is completed during several hours each day, at times selected either by users, or by the utility electric company. The passive flywheel effects are inherent, and the "enhanced flywheel effects" are introduced. Many electric utility companies provide low-cost time-of-use rates, which reduces costs.

17 Claims, 4 Drawing Sheets

DEVICES AND METHODS FOR UTILIZATION OF INTERMITTENTLY AVAILABLE ELECTRIC ENERGY FOR HEATING AND COOLING OF HABITABLE STRUCTURES

SPECIFICATION

Field of the Invention

This invention relates to the field of habitable structures for residential, commercial, industrial or institutional uses, which are designed for utilizing intermittently available electric energy, such as off-peak electric energy provided by the utility companies, or the intermittently available electric energy produced by solar thermal power generation, by photovoltaic devices, or by wind energy; during times when such energy is available; for providing electric energy for heating and cooling system air, used as a heat transfer medium, to heat or cool the manageable energy storage mass, contained within the walls of such structures, said energy being stored for limited periods of time, then retrieved and used as needed for the heating or cooling of the interior surfaces of the exterior walls, which provide a combination of radiant heat transfer and convection heat transfer between said surfaces and the interiors of said structures and their contents and occupants or users, thus maintaining desired temperature levels inside the structures, until the energy stored, either as heat or cold, has been depleted, or until electric energy from the source or sources becomes available once again.

BACKGROUND OF THE INVENTION

Mankind made only slow progress for centuries in developing the capability to provide adequate, comfortable, affordable habitats for themselves. In recent times, progress accelerated, and they learned to provide not only basic shelter, but also heating of the interiors thereof. This was followed later by development of the ability to provide both heating and cooling of the interiors of homes and many other habitable structures used for mankind's various activities.

However, the habitable structures developed have generally not been very efficient in the use of energy. There seemed an abundance of fuels for heating, and later for providing the mechanical energy required for air conditioning. The fossil fuels became relatively low in cost, and remained so for many years, therefore conservation of energy was not considered a very important factor in the designing of homes or other structures. However, in recent times, many have become aware that inefficient use of the favorite and most economical fuels has caused, and is causing, significant environmental problems, that those fuels and other forms of energy are becoming more costly, and that the finite fossil fuels are not being replenished by nature in time frames which are very useful to mankind.

Some Indian tribes in the Western United States have lived for centuries in areas where there were shortages of fuel, and they had only very limited means for transportation. To compensate for this, some of them built homes of sandstone with very thick walls and with narrow window openings. The desert areas where they lived were cold at night and hot in the daytime. The large amount of mass provided by the very thick walls caused delays in outside temperature changes being felt inside. It also provided an averaging effect on inside temperatures experienced, compared to the outside temperatures. This beneficial capability provided by mass in the walls of structures has been given the name "flywheel effect". The name was probably derived from the fact that the mass provided some energy storage, and that is the basic function of the mechanical "flywheel".

In an attempt to make use of the basic principles which made the Indian's thick-walled sandstone homes comfortable, to improve on the usefulness of the natural flywheel effect, to make use of some solar insolation for heating, and to utilize nocturnal thermal radiation of heat energy to outer space to assist in cooling of the habitat, Mr. Austin N. Stanton, one of the co-inventors hereof, has developed and obtained a U.S. Patent on "Building Elements for Heat Storage and Transfer", U.S. Pat. No. 4,526,225, issued Jul. 2, 1985. The technology revealed in that patent seemed to have some potential for the development of improved energy-efficient buildings. However, no commercial development has evolved therefrom. There have been some concerns that the heat losses from the surfaces of the walls to cold ambient air and winds, during the times when there is no solar energy available, might exceed the gains from solar insolation on the walls. This being probable, the means of the invention could only provide minor improvement over the natural flywheel effect. Consequently, the invention has not been commercially developed or utilized.

There now seems an urgent need for more practical and economical methods for utilizing the intermittently available sources of electric energy for the heating and air conditioning of habitable structures. Utilizing such sources of energy for these purposes, because of their basic nature, would require the ability to store energy for at least several hours, and to later retrieve and use the energy as needed, until the stored supply thereof is depleted, or the intermittently available supply again becomes available. Sources of intermittently available electric energy include low-cost off-peak electric energy beneficially provided by electric utility companies, electric energy produced by wind generators, and electric energy produced from solar energy by solar-thermal power generation or by photo-voltaic cells.

The previous invention by Mr. Stanton, served a useful purpose, because it was the interest in the basic concepts presented therein, which have evolved into the present invention. There seems a very real need for combining the effective use of the natural (or passive) flywheel effect, and new technology which is introduced herein as the "enhanced flywheel effect", to minimize the energy requirements for heating and cooling for habitable structures. The enhanced flywheel effect improves on the usefulness of the natural flywheel effect by making it possible to advantageously move heat or cold, derived from the environment and stored in the energy storage mass, in transverse horizontal directions within the energy storage walls of habitable structures. Objects of the present invention include providing these needs effectively and economically, to reduce energy requirements.

The present invention provides devices and methods for utilizing intermittently available electric energy, combined with the storage of energy, as heat or cold, and the retrieval and use of such stored energy, to effect the heating and cooling of habitable structures, as required. The use of off-peak electric energy to heat and cool many homes, and various other structures, can provide substantial benefits for electric utility companies. The benefits include enhancing and facilitating their load management capability, and also effecting reductions in the reserve generating capacity required to meet the maximum peaking demands of their systems.

The off-peak electric energy is used to provide heat or cold for the heating or cooling of system air, which is then used as an energy transport medium, for heating or cooling the energy storage medium in the exterior walls of the structures. The energy storage medium then provides energy, as heat or cold, for heating and cooling system air, which is used to heat or cool the interior surfaces of exterior walls of the habitable structures, as needed. The intermittently available electric energy generated by windmills or by the use of solar energy, is also made effectively useful for supplementing the energy supplies utilized by the devices and methods of the present invention.

SUMMARY OF THE INVENTION

The present invention provides devices and methods for utilizing intermittently available electric energy, combined with substantial energy storage capacity, energy retrieval, and energy use to effect the heating and cooling of interiors of habitable structures and the contents and occupants or users thereof, whenever combined natural flywheel effects and enhanced flywheel effects are not sufficient to maintain comfortable temperatures inside such habitable structures. The forms of intermittently available electric energy which can be effectively utilized include the low-cost off-peak electric energy, which can be provided very advantageously by most electric utility companies, and electric energy produced from intermittently available natural energy sources by the use of wind generators, photo-voltaic cells and solar-thermal power plants.

Providing off-peak electric energy for use in many homes and in other habitable structures can be very beneficial and profitable for electric utility companies providing such energy, because controlling the time of use of such energy can enhance and facilitate their load management capability, and can also effect reductions in the amount of reserve generating capacity which is necessary for meeting system peaking demand requirements. Devices and methods of the invention allow the use of low-cost off-peak electric energy and conventional air heating and air cooling equipment (electric resistance heaters and standard air conditioners, or electrically driven heat pumps) for heating or cooling of system air, which heats or cools energy storage medium.

The system air is moved in closed circuit as a heat transfer medium, for heating or cooling the permeable concrete and sized gravel used as the energy storage medium. Heat or cold, stored in the energy storage medium, is retrieved and used as required for heating or cooling system air, which heats or cools the interior surfaces of the exterior walls. The interior surfaces then provide a combination of radiant heat transfer and convection heat transfer for heating or cooling the interiors of the habitable structures and their contents and occupants or users.

The present invention also provides for beneficial utilization of the passive (or natural) flywheel effect of the massive energy storage walls, and introduces an unique "enhanced flywheel effect", wherein the heat or cold within the energy storage medium, which is produced by the effects of changing air temperatures, humidity and wind, is moved through the energy storage medium by the movement of system air therethrough, thus substantially improving effectiveness, compared to the "inherent flywheel effect". This new capability is appropriately called the "enhanced flywheel effect".

The present invention includes unique designs for energy storage blocks, making them effective for providing strong, durable energy storage walls, as exterior walls for habitable structures. It also includes designs for special cap beams, which are installed on top of the walls, to maintain alignment of the walls and firm connections through corner cap blocks, at corners of the structures. Each cap beam contains three long air manifold tubes, used to distribute system air to, and collect and return system air from, appropriate slots in the upper blocks of the energy storage walls. This allows the pressurizing of system air in specific air plenums within the energy storage walls. The air plenums are formed by matching air slots in the energy storage blocks of the energy storage walls.

The plenums reach from the foundations to the cap beams, and a parallel array of plenums spans the length of each individual wall segment. Plenums are used for the inflow of pressurized system air, to effect control of the horizontal, transverse flow of system air through the energy storage medium. Controlling the slow, horizontal, outward flow of system air, within the walls, effects the storage of energy as heat or cold, in the energy storage medium, and reversing the flow of air allows the retrieval of the heat or cold for heating or cooling the interior surfaces of the external walls as desired.

Substantially reducing the quantity of energy required for the space heating and cooling functions, and using the low-cost intermittently available forms of electric energy, makes these habitable structures less costly to own and inhabit or use. These capabilities can also reduce the effects of escalating energy costs in heating and cooling of habitable structures.

BRIEF DESCRIPTION OF THE DRAWINGS

The drawings are provided to facilitate the understanding of the present invention and also to illustrate advantages and significance.

Also in cross-section, heavy foundations are shown supporting the energy storage walls, and extending horizontally a few inches beyond the outside surfaces of the energy storage blocks, to support the steel framing for containing wall insulation and the wall siding shown, and extending horizontally inward about one inch, providing a ledge for the seal coating on the inside wall surfaces. A concrete slab floor is shown, separated from the block wall by a relatively thick insert of expansion joint material. A steel beam is shown as as a ceiling joist fastened by bolts to the top of the cap beam with steel rafters fastened thereto. Steel hats installed on the top side of the rafters support the sheathing and shingles or tiles shown on the roof. The crown beam of the roof is not shown.

Shown as an in-depth cross-sectional view is the cap beam with three air manifold tubes shown therein, and with smaller tubes called spiles connecting the air manifold tubes to three of the air passages called plenums, which are formed by air slots in the energy storage blocks. The outermost plenum is shown with no connection to an air manifold tube, it being used only as as air-gap insulation to reduce energy losses to the outside environment. Air inlet/outlet tubes are shown, connected to the three air manifold tubes, with the innermost two air inlet/outlet tubes having air valves therein, and both being shown connected, one behind the other in this view, to a single air duct above the cap beam. The outermost air manifold tube is shown connected through the air inlet/outlet tube to a second air duct shown above the cap beam. The two air ducts are shown connected to the air inlet/outlet tubes and running parallel to the cap beam, then turning inward toward the interior of the habitable structure.

The present invention provides devices and methods for utilizing intermittently available electric energy for the heating or cooling of system air, combined with effective energy storage, retrieval and use, to effect the heating and cooling of habitable structures, as needed. Sources of intermittently available electric energy include off-peak electric energy provided by utility companies, the electric energy generated by windmills, or produced by photo-voltaic cells, or produced from solar insolation by using thermal electric generation. The present invention provides sufficient mass for the energy storage medium, in the exterior walls of the habitable structures, to provide beneficial use of the passive (or natural) flywheel effect, and also introduces the new "enhanced flywheel effect", wherein heat or cold from outside, received in the outer portion of the mass of the energy storage medium, may be moved further inward toward the interior of the energy storage medium, sustantially increasing its energy storage capacity, which is then used for heating or cooling of the interior wall surfaces of those exterior walls, which then effects the heating or cooling of the interiors, contents and occupants of the habitable structures.

Figure 1:
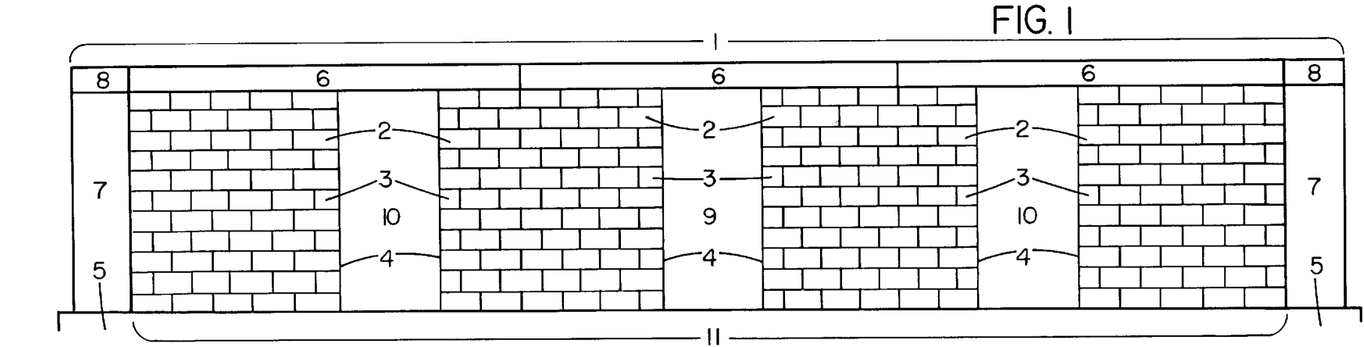
FIG. 1 is a frontal elevation view of a habitable structure of tie present invention, without the roof, wall insulation and siding, and with the seal-coating removed from the block walls, to expose the full-size energy storage block walls, the half-size energy storage blocks, the cap beams and the foundations. The wall segments, corner columns, corner cap blocks, door openings, and window openings are also shown.

The devices provided for a preferred embodiment of the invention and their construction and inter-relationships are as follows:

Referring to FIG. 1, an elevation view of a habitable structure 1 is shown with the roof, outside wall insulation and siding removed, thus exposing full-size energy storage blocks 2, and half-size energy storage blocks 3, forming wall segments 4, which are supported by a heavy foundation 5, which is joint-free and made of steel-reinforced concrete, with cap beams 6, made of reinforced concrete, positioned on the top of wall segments 4. Corner columns 7 are shown connecting wall segments 4 at the corners of the habitable structure 1. Corner cap blocks 8, of reinforced concrete, are shown supported by corner columns 7, and connecting two cap beams 6 at corners of the habitable structure 1. The cap beams 6 cross over door openings 9 and window openings 10, of energy storage walls 11. The cap beams 6 extend in a straight line from one corner cap block 8 to another corner cap block 8, as shown.

Figure 2:
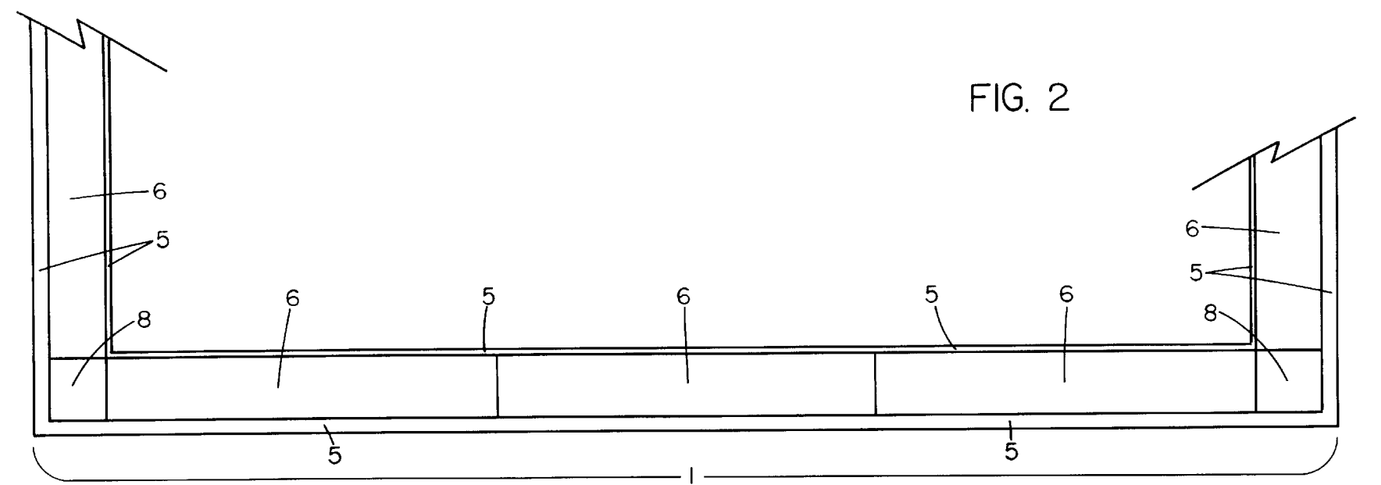
FIG. 2 is a plan view of the frontal portion of the habitable structure shown in FIG. 1, as indicated by the break line, showing the cap beams, corner cap blocks and extensions of the foundation, for the front wall and for a portion of two side walls in plan view.
Figure 5:
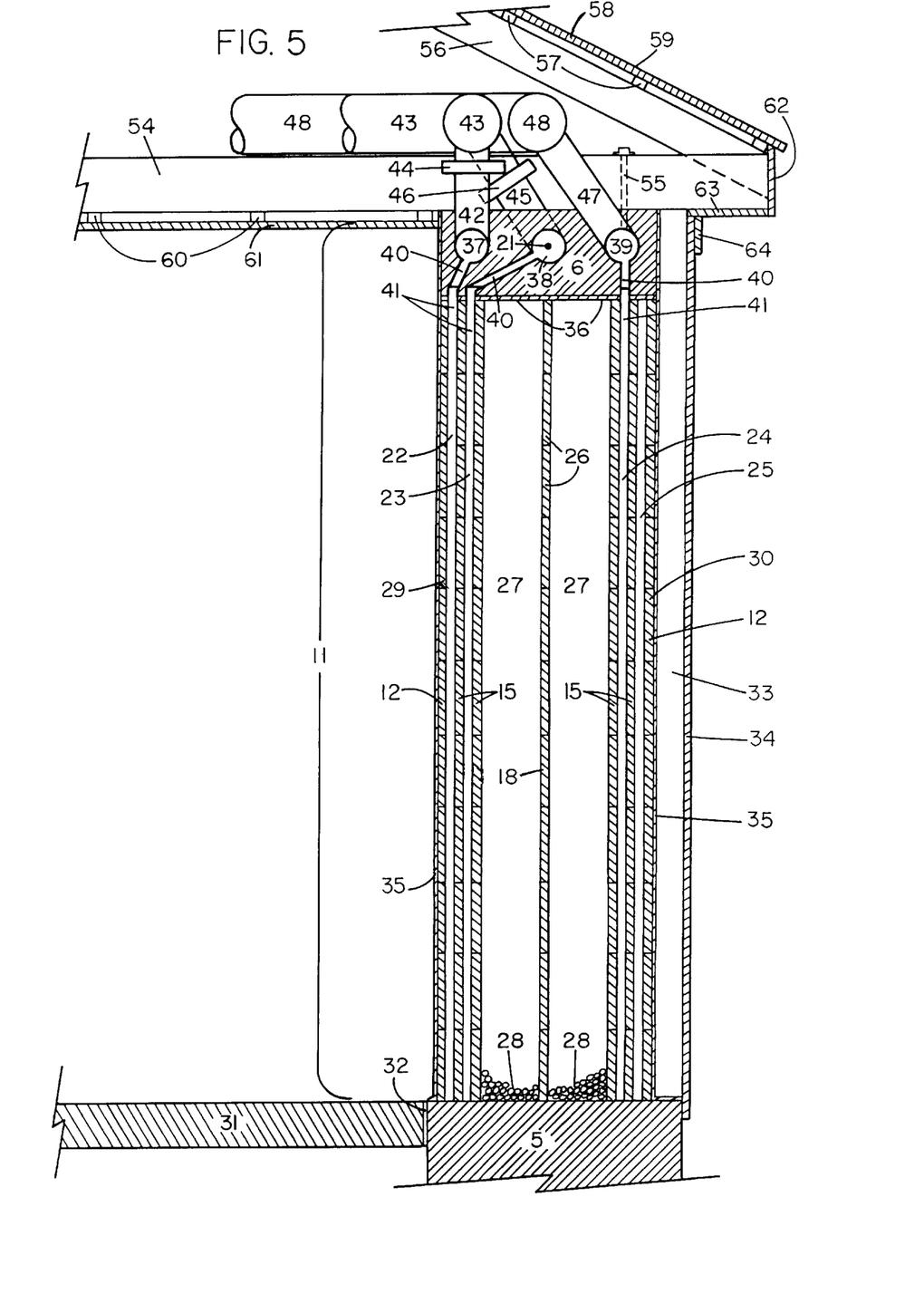
FIG. 5 is a cross-sectional drawing, which presents a vertical cross-sectional view, as taken through an energy storage wall of the preferred embodiment of the invention. Energy storage blocks forming the wall are shown stacked, one above another. Seal-coating is shown covering the energy storage blocks and extending upward onto the cap beam and outward onto the foundation. Four vertical air passages, called plenums, are shown in the wall, as formed by air slots in the blocks, and columnar gravel chambers are shown as formed by storage compartments in the energy storage blocks. A small amount of energy storage gravel is shown at the bottom of the gravel compartments, for convenience, instead of showing the chambers filled with gravel.

Referring to FIG. 2, a plan view of the frontal portion of the habitable structure 1, shown in FIG. 1, shows the cap beams 6, corner cap blocks 8, and visible portions of the heavy foundation 5, which extends outward beyond the energy storage blocks 2 and 3 (not shown in this view) to support insulation and wall siding (not shown in this view, see in FIG. 5), and which also extends inward to provide a sealing ledge for the wall coatings (not shown in this view, see in FIG. 5).

Figure 3:
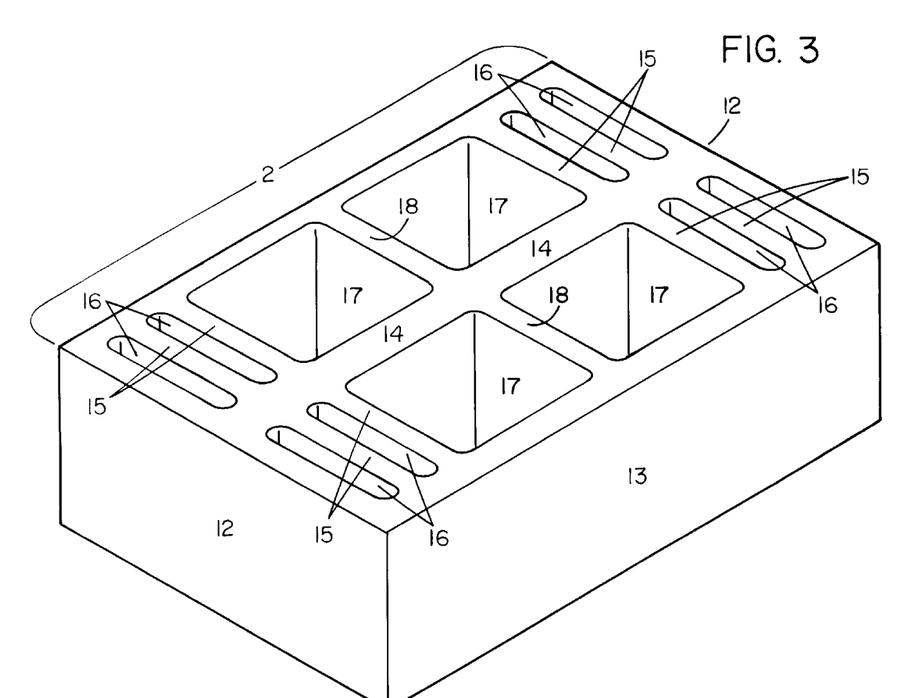
FIG. 3 is an oblique view of a full-size energy storage block, showing the short side plates, the longer end plates, a rather wide central divider, and narrower internal webs. Four pairs of narrow in-line air slots are shown as formed by the side plates, the short internal webs, and the central divider. The four rectangular gravel compartments are shown as formed by a central divider, short internal webs, and short central webs.

Referring to FIG. 3 a full-size energy storage block 2 of FIG. 1, is shown in an oblique projection. Masonry Industry's terminology gives the dimensions of concrete blocks as first the block width "W", which defines the thickness of a wail formed by the blocks, followed by the height "H" of the block, followed by the length "L" of the block, which is the distance the block occupies in the direction of the wall. Therefore, to be in conformity, the dimensions of the full-size energy storage blocks 2 of the preferred embodiment may be given in the same order: being twenty-four inches wide, by seven and seven-eighths inches high (hereinafter referred to as eight inches, also to be in conformity), by sixteen inches long. Thus dimensions are shown as (24×8× 16), conforming with the industry standards. Full-size energy storage blocks 2 are produced on metal pallets in a standard three-block concrete block manufacturing machine. Each such pallet supports one full-size energy storage block 2, instead of the intended three, eight inch by eight inch by sixteen inch conventional concrete blocks, (sometimes called Hadite Blocks or Cinder Blocks). Because of the very large size of these full-size energy storage blocks 2, external dimensions and flatness must be very accurately controlled.

The side plates 12 are thus eight inches high by sixteen inches long. The end plates 13 are eight inches high by twenty-four inches wide. A central divider 14, about two inches in thickness, is shown spanning across the long dimension (width) of a full-size energy storage block 2, and terminating in opposite side plates 12 thereof. Internal webs 15, about one inch in thickness, extend between the end plates 13 and the central divider 14, on both sides of the central divider 14. The internal webs 15 form dividers between parallel air slots 16, which are about one inch in width by six inches in length, and between the inner of air slots 16 and storage compartments 17. Central webs 18, about one inch in thickness, separate two storage compartments 17, each about six and one-half inches by six inches in horizontal dimensions, on each side of central divider 14, providing four storage compartments 17, in each full-size energy storage block, with storage compartments 17 extending vertically through full-size energy storage blocks 2.

The central divider 14 separates in-line air slots 16, on either side therof, forming two pairs of in-line air slots 16 near each side plate 12 of the full-size energy storage blocks 2. The air slots 16 and the storage compartments 17 extend vertically through full-size energy storage blocks 2. This forms bottoms of the full-size energy storage blocks 2, which are shaped as the tops, except for the effect of slight tapering of the internal webs 15, central webs, 18, central divider 14 and inside surfaces of side plates 12 and end plates 13. The tapering is required to facilitate removal of full-size energy storage blocks 2 from special block molds, during their production.

Figure 4:
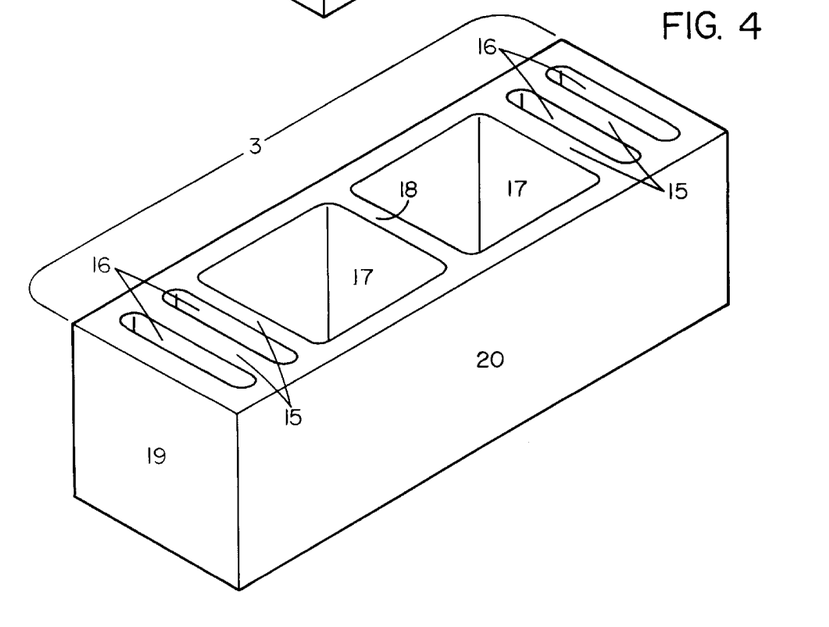
FIG. 4 is an oblique view of a half-size energy storage block, the top or bottom of which matches up with one half of either the top or the bottom of a full-size energy storage block shown in FIG. 3. Four air slots and two gravel compartments are also shown, required to match up with one half of the full-size energy storage block.

Referring to FIG. 4, a half-size energy storage block 3 of FIG. 1 is shown, with the top and bottom thereof designed to match the top or bottom one-half of the full-size energy storage blocks 2, shown in FIG. 3. A half-size energy storage block 3 is shown with side plates 19, eight inches high by eight inches long, and with end plates 20, eight inches high and twenty-four inches wide. The internal webs 15, divide half-size energy storage blocks 3 into two air slots 16 near each side plate 19, and separate the inner of the air slots 16 from two storage compartments 17. A central web 18 divides two storage compartments 17, one on either side thereof, as in each one-half of full-size energy storage block 2. Storage compartments 17 and air slots 16 extend vertically through half-size energy storage blocks 3. Webs 15, central web 18, and the inner walls of the side plates 19 and of the end plates 20 are tapered, as in the case of full-size energy storage blocks 2, of FIG. 3. A slight miss-match of tops and bottoms, caused by the dimensions required to accommodate tapering, causes no problem during construction.

Referring to FIG. 5, a vertical cross-sectional view is shown as taken across the width (thickness), and the height, of energy storage wall 11, showing the internal webs 15, the central webs 18, and the side plates 12 of full-size energy storage blocks 2, heavy foundation 5, and cap beam 6. The first air plenum 22, second air plenum 23, third air plenum 24, and fourth air plemum 25, are shown within the energy storage wall 11. Air plenums, 22, 23, 24 and 25 are formed by air slots 16 of the full-size energy storage blocks 2, (and by air slots 16 of half-size energy storage blocks 3, if the cross section is taken near the end of a wall segment 4, where these half-size energy storage blocks are used).

A central plate 26, is shown on the centerline of the energy storage wall 11, and is formed by central webs 18 of the full-size energy storage blocks 2 (and of half-size energy storage blocks 3). The internal webs 15 of full size energy storage blocks 2, and of half-size energy storage blocks 3, separate the air slots 22 and 23, and air slots 24 and 25, from one another, and also separate inner air slots 23 and 24 from the columnar gravel chambers 27, as shown. Columnar gravel chambers 27 are formed by the storage compartments 17 of the energy storage blocks 2 and 3, and extend from foundation 5 to the bottom of cap beam 6. The columnar gravel chambers 27 are filled with energy storage gravel 28, before the cap beams 6 are installed on the top of energy storage walls 11. In FIG. 5, a small amount of the energy storage gravel 28 is shown at the bottom of the columnar gravel chambers 27, for illustration. Interior wall plates 29, and exterior wall plates 30, are formed by side plates 12 of full-size energy storage blocks 2, and by side plates 19 of half-sized energy storage blocks 3 if the cross section is taken near an end in a wall segment 4 (see FIG. 1) of an energy storage wall 11.

A concrete slab floor 31 is shown, as separated from the heavy foundation 5 by concrete expansion joint material 32. The foundation 5 is shown extending outward a few inches from the base of the energy storage wall 11, for supporting wall insulation 33 and also siding 34 (outside wall coverings), contained within steel framing (not shown). A seal coating 35 is shown bonded to the interior wall plates 29, and to the exterior wall plates 30 of a wall segments 4, extending upward onto the cap beam 6 and outward onto a ledge of foundation 5, forming an air-tight seal. The seal coating 35 also extends across the end faces (not shown) of each wall segment 4 (see FIG. 1), and under the bottom of cap beam 6 in door openings 9 and window openings 10, thus forming a complete seal around wall segments 4, allowing pressurizing of system air within individual plenums 22, 23, or 24, of the wall segments 4 of energy storage walls 11, thereby permitting pressure differentials needed for control of the direction of flow, and the quantity of flow, of system air, while maintaining system air in a closed-circuit system. Interior wall plates 29 and the seal coating 35 thereon, form the interior surfaces of the exterior walls of the habitable structures, and are used for heat transfer to or from the interior of the habitable structures and its contents and occupants, as described later herein.

The cap beams 6 are shown bonded to the upper layer of energy storage blocks 2 and 3 of the energy storage walls 11 by a bed of sealing mortar 36, therebetween. The sealing mortar 36 is formed so that it isolates the individual air plenums 22, 23 and 24, thereby making possible the control of system air pressures and the flow of system air. Cap beams 6 contain first air manifold tube 37, second air manifold tube 38, and third air manifold tube 39, provided for distributing system air to, and collecting system air from, first air plenum 22, second air plemum 23 and third air plenum 24. The small air tubes called spiles 40 connect the air manifold tubes 37, 38 and 39 to small longitudinal air channels 41, in the bottom face of the cap beam 6, at each full-size energy storage block 2. Air channels 41 match up to slots which pass through the bed of mortar 36, as shown, to allow the free passage of air into or out of air plenums 22, 23 and 24.

The long air channels 41 in the bottoms of cap beam 6 span the length of the cap beam 6, but are sealed off at door openings 9 and window openings 10, formed between wall segments 4, as shown in FIG. 1, and at the ends of cap beams 6. Long air channels 41 assist in effecting uniform distribution of system air to, and collection of system air from, first, second and third air plenums, 22, 23, and 24. These air channels match the openings through the sealing mortar, and allow the system air to flow to and from the air plenums. The fourth air plenum 25 is used as air-gap insulation for reducing the energy losses to the outside of the energy storage wall 11.

The air plenums 22, 23 or 24, within energy storage wall 11, each form a planar family of air passages, which extends from the bottom of the cap beams 6 down to the top of the foundation 5, and from one window opening 10 or door opening 9 (see FIG. 1) to the next window or door opening, and from one window or door opening to corner column 7, of the habitable structure. The parallel rows of vertical columnar gravel chambers 27 also form an array thereof, which extends from the bottoms of cap beams 6 to the top of the foundation 5, and spanning the length of each wall segment 4, shown in FIG. 1. These columnar gravel chambers 26 are filled with energy storage gravel 28 before the cap beams 6 are installed on top of the energy storage walls 11.

The first air manifold tube 37 inside the cap beam 6 is located near the inside wall surface, and it is shown connected to first air inlet/outlet tube 42, which is located near the longitudinal center of the cap beam 6, and extending vertically upward to connect to a first air duct 43. The first air inlet/outlet tube 42 contains a first air valve 44, which allows the flow of system air to be passed through or to be stopped thereby. The second air manifold tube 38 is located in the center of the cap beam 6, and connected to second air inlet/outlet tube 45, which contains second air valve 46. Second air inlet/outlet tube 45 extends upward and angles inward to allow it to also be connected to first air duct 43, which is directly above first air manifold tube 37. The second air inlet/outlet tube 45 must be offset a short distance along the cap beam 6, from the first air inlet/outlet tube 42, to allow both to be connected to the same first air duct 43. The third air manifold tube 39, located between the center and the outside of cap beam 6, and is connected by third air inlet/outlet tube 47, (which has no air valve therein), to second air duct 48, also located above and parallel to cap beam 6.

Figure 6:
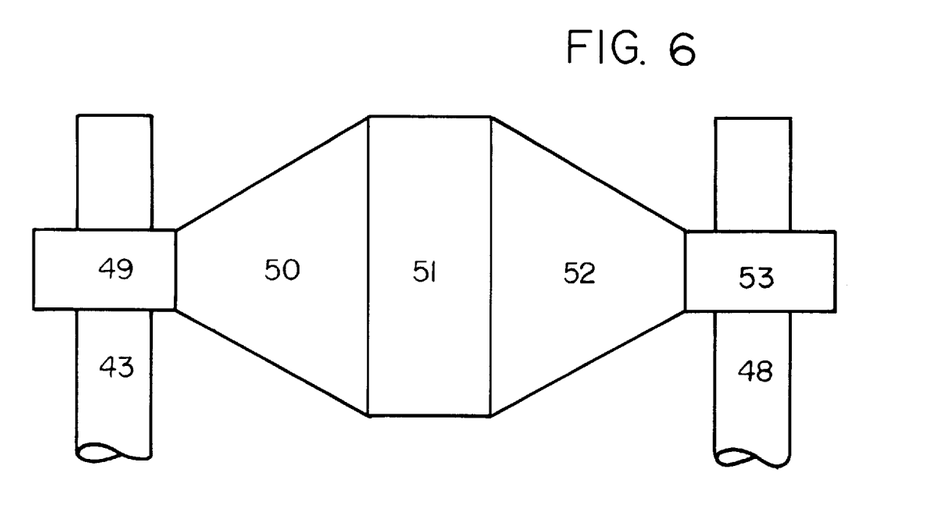
FIG. 6 shows, in a plan view, the two air ducts connected to two air blowers, being oriented to move air in opposite directions, with the air passing in the reverse direction, to that of a running air blower, through one idled blower, to permit the reversing of air flow without the need for complex flow-reversing valves, and the air blowers are shown conneced by additional air ducts to either side of the air heating and air cooling equipment which is used to heat or cool the system air used as the heat transfer medium for storing and retrieving energy as either heat or cold.
Figure 7:
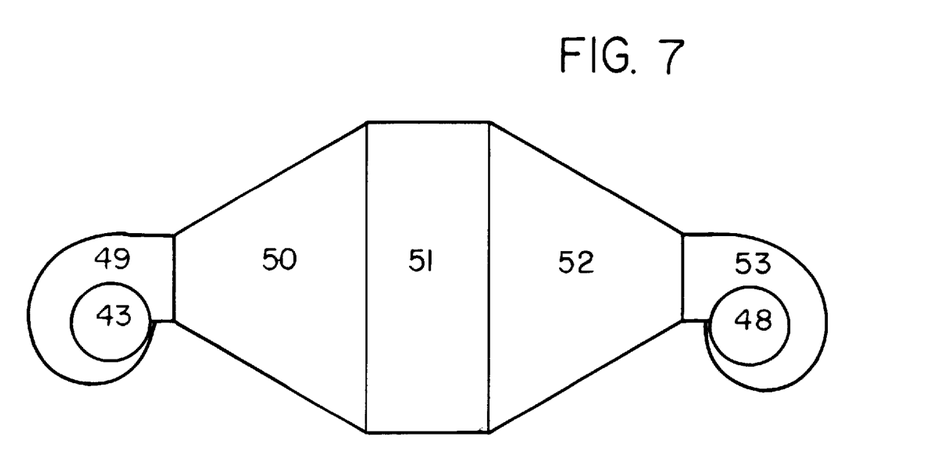
FIG. 7 shows, in a vertical elevation view, the same ducts and equipment shown in FIG. 6.

The first air duct 43 and second air duct 48 run parallel to and above cap beam 6, then turn inward at a selected point to join with other first air ducts 43 and second air ducts 48, from the other cap beams 6, and then make connections with the air heating and cooling equipment 51 (see FIG. 6). The heating and cooling equipment 51, as shown in FIGS. 6 and 7, may serve these air ducts for several wall segments 4, and for all the energy storage walls 11, of a habitable structure 1, or for a portion of the energy storage walls 11 of very large habitable structures.

The first air duct 43 connects to first air inlet/outlet tube 42 which has first air valve 44 therein. The first air duct 43 also connects to second air inlet/outlet tube 45, which has second air valve 46 therein. The first air duct 43 also connects to first air blower 49, shown in FIG. 6. Second air duct 48 connects third air inlet/outlet tube 47, (which has no air valve therein), to second air blower 53, as shown in FIGS. 6 and 7. A third air duct 50 connects first air blower 49 to heating and cooling equipment 51. Fourth air duct 52 connects heating and cooling equipment 51 to second air blower 53, which is also connected to second air duct 48. In another embodiment air flow reversing valves may be used, with only one air blower being required. In yet another embodiment, one positive displacement (PD) air blower may be used, wherein the flow of air may be reversed by reversing direction of rotation of the rotor assembly of the PD air blower.

Referring to FIG. 5 and FIG. 6, when first air blower 49, is in operation, second blower 53 is idled and system air passes in the reverse direction (for a running air blower) therethrough. When the second air blower 53 is placed in operation, first air blower 49 is idled and system air passes in the reverse direction (for a running blower) therethrough. This is preferred to using flow-reversing air valves to reverse the direction of flow of system air, as is required for the production of energy as heat or cold from the intermittently available electric energy and storage of such energy as heat or cold in one case, and then retrieving and using such energy, as heat or cold, for heating or cooling the interior of said habitable structure 1 and its contents and occupants.

Steel framing for the roof is shown in FIG. 5, with steel beams as ceiling joists 54, with anchor bolts 55 fastened into nuts which are imbedded in cap beams 6. The ceiling joists 54 and steel rafters 56 may be on four foot centers, with steel hats 57 on sixteen inch centers (or on twenty-four inch centers), supporting the sheathing 58. Shingles, 59, (preferrably fireproof), will be installed on the sheathing. Furring strips 60 are attached to the underneath side of ceiling joists 54 for mounting of ceiling sheetrock 61 (plasterboard) above which insulating material (not shown) is installed. The box cornice may be comprised of facia boards 62, soffit boards 63 and frieze boards 64, as shown in FIG. 5. In other embodiments, other types of ceiling panels, and other types of cornice construction may be used.

In another embodiment, long steel beams will be used to provide transverse beam strength, and bolted down to the top of cap beams 6, flush with the outer edge thereof. Steel rafters will be fastened to the long steel beams, and will span the entire distance to the crown beam of the roof, or to a hip rafter. Insulation will be installed between the rafters, and metal hats will be used to support sheathing on which shingles will be installed, and metal furring strips will be used to support panelling underneath the rafters. This eliminates the need for attics in these habitable structures, and will allow for cathedral type ceilings being used in the selected portions of these habitable structures. In this embodiment hereof, ceiling joists and ceilings may be installed above some of the rooms of the habitable structures, with floors thereon for mounting the air ducts, the air blowers, the heating and cooling equipment and controls for the air handling system.

The cap beams 6 are installed on the tops of the energy storage walls 11. The walls are constructed by lapping the full-size energy storage blocks 2, and using the half-size energy storage blocks 3, at opposite ends of alternate layers of blocks, or at both ends of every second layer of blocks, in individual wall segments 4, both methods being shown in FIG. 1. This allows lapping half-way of the full-size energy storage blocks 2 in successive layers, as shown in FIG. 1, to provide optimum strength for energy storage walls 11, and to prevent cracking of energy storage walls 11, and cracking of seal coating 35 on the completely sealed wall segments 4.

The full-size energy storage blocks 2 and the half-size energy storage blocks 3 are made of air-permeable concrete to minimize the pressure drops of the system air flowing therethrough. Permeability is achieved by removing the fines from the aggregate, before it is used in the concrete mix, and by careful control of moisture content of the cement slurry and aggregate mixture, to effect the coating of the granules of the aggregate particles with the wet cement and sand mixture (with Pozzolan) while not filling the interstices between the particles of aggregate. In this manner, both the permeability, and uniformity of permeability, are effectively maintained when producing the energy storage blocks. The aggregate used is smaller than about three-sixteenths inch top size particles, in order to minimize the time required for heating or cooling the concrete, and also the time required for recovering heat or cold from the concrete. The fines are screened from the aggregate to facilitate maintaining the air permeability necessary for good performance.

The seal coating 35 for the surfaces of the wall segments 4 of the energy storage walls 11, is comprised of one or more thick layers of impermeable stucco or mortar cement, which is trowelled onto the surfaces of wall segments 4 of energy storage walls 11, and coated with one or more layers of fiberglass reinforced epoxy cement, also trowelled onto all the wall surfaces. These seal coatings 35 extend outward onto the heavy foundation 5, which supports energy storage walls 11. Steel wire mesh may be used on the wall surfaces, embedded in the stucco or mortar cement, for added strength. The seal coating 35 extends upward onto the sides of the cap beams 6, and outward onto the bottom of the cap beams 6 in door openings 9 and window openings 10, thus sealing air channels 41 in the bottom of the cap beams 6, spanning across those openings. Seal coating 35 provides pressure tight sealing of the individual wall segments 4 to prevent leakage of the system air into or out of the wall segments 4.

The wall segments 4 are constructed between the door openings 9 and the window openings 10, and between the door openings or window openings and the corner columns 7 of the habitable structures. The corner columns may be made of various conventional materials, being preferably made of conventional concrete blocks. The corner columns are not considered a part of the energy storage walls, per se, but are important components of the habitable structures. As a viable alternative, the corners may be formed by cross-lapping of the energy storage blocks. In this case, a corner cap block is still required at all four corners of the structure, and the cap beams should stop at the inside corner of the walls, since energy stored in the corners could not be reclaimed and used in the interior of the structures. In another embodiment, similar wall segments may be used as interior walls for providing additional energy storage inside said habitable structures. They may also be used back to back in adjoining walls of duplex apartments or hones constituting said habitable structures.

The cap beams 6 span all door openings 9 and all window openings 10 of energy storage walls 11. One or more cap beams 6 are installed in a straight line from one corner column 7 of a habitable structure 1 to another corner column 7 of the habitable structure 1. The cap beams 6 are made of impermeable concrete; strengthened by the steel reinforcing rods 21 shown in FIG. 5. The cap beams 6 are bonded to the upper surfaces of the top layer of energy storage blocks 2 and 3 on the energy storage wall 11, after the energy storage blocks 2 and 3 have been placed in the wall segments 4 of energy storage walls 11, and after columnar gravel chambers 27 have been filled with energy storage gravel 28. The energy storage gravel 28 is sized between about one-quarter inch top size and about one-sixteenth inch bottom size, to achieve optimum performance. Larger particle-size gravel is less useful because it would require much more time and too great temperature differentials for the heating or cooling thereof, and for retrieval of heat or cold therefrom. The larger gravel tends to reduce pressure drops across the gravel in the storage compartments, which reduces the air flow through the permeable concrete, and thus adversely affects the heat storage capacity therein. The smaller particles (coarse sand) would produce too much pressure drop in the system air moving therethrough, thus requiring higher air pressures and greater energy consumption.

The air inlet/outlet tubes 37, 38 and 39, are located near the center of each cap beam 6, and extend upward from the upper surfaces of the cap beams, at angles which allow them to be connected to the air ducts 43 and 48, positioned above the cap beam. Air inlet/outlet tubes 42, 45 and 47 connect the air manifold tubes to the air ducts. The air ducts 43 and 48 are shown located above ceiling joists 54 and running parallel to the cap beams 6, then turning inward to connect to first and second air blowers 49 and 53, as shown in FIG. 6. The roof members shown herein are depicting steel construction materials. In some other embodiments, wood construction materials may be used.

The air manifold tubes 37, 38 and 39, extend a short distance beyond the ends of the cap beams 6, to match up with the air manifold tubes 37, 38 and 39 of adjoining cap beams 6. Gaps remaining between the concrete ends of adjacent cap beams 6, caused by the extending ends of the air manifold tubes 37, 38 and 39, will be filled with impermeable concrete to form air tight seals, and to maintain the alignment of the cap beams 6 on the energy storage walls 11. The cap beams 6 are placed under imposed compressive stress by tension rods (shown in FIG. 5 only), extending through the center of the cap beam 6 (inside the center air manifold tube 38) and through two corner cap blocks 8, as shown in FIG. 1 and FIG. 2.

Corner cap blocks 8, having the same thickness and width as cap beams 6, are made of reinforced concrete. They are used to connect two cap beams 6 at each corner of the habitable structures, and to tie the energy storage walls firmly together at the corners. Heavy foundations 5, formed without joints and reinforced by steel rebar, also tie the walls together at the corners of the structures. Corner cap blocks 8 are fitted between ends of two cap beams at the corners, and gaps between the corner cap blocks and the cap beams, caused by the air manifold tubes 37, 38 and 39 extending beyond the ends of the cap beams 6 are filled with impermeable concrete mortar to seal the tubes and strengthen the energy storage walls 11.

Corner cap blocks 8 contain imbedded steel-reinforced recesses (not shown), and threaded nuts (not shown) are used for tightening of the tension rods 21. The tension rods 21 pass through the second air manifold tubes 38, which extend through the length of the in-line cap beams 6, and tie the cap beams 6 together firmly at the joints. The tension rods 21 also pass through the corner cap blocks 8, and tie two cap beams 6 together firmly, at all the corners of the habitable structure 11. The tension rods 21 maintain compressive stresses in the cap beams of energy storage walls 11, thereby improving the bear strength and the transverse load carrying capacity of energy storage walls 11.

The methods of the preferred embodiment, provided for utilizing the devices of the preferred embodiment are as follows:

During the "air heating or cooling and energy storage mode of operation", system air is heated or cooled by the heating or cooling equipment, during the times when the intermittent electric energy is available. An air blower pressurizes system air, and the resulting pressure differentials effect the movement of the system air through the system in closed circuit. The energy, as heat or cold, is stored in the energy storage medium as heated or cooled system air is moved slowly, and horizontally, outward therethrough. The energy storage medium is comprised of the permeable concrete of the central portions of the full-size energy storage blocks 2, half-size energy storage blocks 3, and the energy storage gravel 28, which is contained within the columnar gravel chambers 27.

In this mode of operation, the system air is taken from plenum 24, through air channel 41 and spiles 40, into third manifold tube 39, and through third air inlet/outlet tube 47, thence to second air duct 48, and to the inlet of second air blower 53 (see FIG. 6). The system air is pressurized by second air blower 53, passes through the fourth air duct 52, and into air heating and cooling equipment 51. After being heated or cooled therein, system air is passed through the third air duct 50, and the first idled air blower 53 (not in use in this case), through first air duct 43, then takes one or the other of the two alternate routes described herebelow:

Route 1: system air passes through first air inlet/outlet tube 42 and open first air valve 44 (the second air valve 46, in second air inlet/outlet tube 45 will be closed), then into the first air manifold 37, through spiles 40 and air channel 41, into first air plenum 22. While heating or cooling interior wall plate 29, system air is passing from first air plenum 22, moving horizontally outward through the energy storage medium (the permeable concrete and energy storage gravel 28), and heats or cools the energy storage medium, then enters plenum 24, where the description of this cycle started. This energy production and storage cycle operates continuously, and stores heat or cold in the energy storage medium, until sufficient energy has been stored to provide estimated near-term requirements. This first alternate route is used whenever heating or cooling is needed in the interior of the structure, at the same time the heat or cold is being produced and stored. The second alternative route is described below. The second alternative route used when interior temperatures are satisfactory, and no additional heating or cooling is needed inside the habitable structure 1, while energy is being produced and stored as heat or cold.

Route 2: the heated or cooled system air is passed through the second air inlet/outlet tube 45 and open second air valve 46 (while first air valve 44 in first inlet/outlet tube 42 is closed), and then into second air manifold 38, through spiles 40, air channel 41, into the second air plenum 23, which is separated from first air plenum 22 by a one inch thick internal web 15. From second air plenum 23, the heated or cooled system air passes horizontally end slowly outward through the energy storage medium, and heats or cools energy storage medium, then enters the third air plenum 24 to repeat the cycle. The cycle operates continuously, storing heat or cold in energy storage medium, until sufficient energy has been stored to satisfy etimated near term requirements. If, during the use of this cycle, there is a need for heating or cooling inside the habitable structure 1, then the air control valves may both be changed and the first alternative method described above may be used as long as it is needed. These two alternate methods may thus be used as needed.

The energy storage medium first contacted by the hot or cold system air passing therethrough is heated or cooled more than is the energy storage medium contacted at points further from the inlet of heated or cooled system air, through the first or second air plenums. Therefore, a greater quantity of energy is stored, as heat or cold, near the portion of the energy storage walls, to minimize the energy losses to the environment. The system air, after passing through the energy storage medium, and giving up a portion of its energy to the energy storage medium, as heat or cold, then enters the third air plenums 24 to pass through the entire cycle, again and again.

When heat or cold has been stored in the energy storage medium, and the heat or cold is needed inside the structure, the system is placed in operation with the flow of system air being in the reverse direction of that used for energy storage. First air blower 49 is used in the energy retrieval mode of operation, and second air blower 53 is idled. The system air is pressurized by first blower 49, and is passed through third air duct 50, heating or cooling equipment 51 (which is not in use), fourth air duct 52, idled second air blower 53, second air duct 48, third air inlet/outlet tubes 47, third air manifold tube 39, spiles 40, air channels 41, and into plenums 24. The system air then passes horizontally inward through the energy storage medium, through air plenum 23, and into air plenum 22. It then returns through air channels 41, spiles 40, first air manifold tube 37, first air inlet/outlet tube 42, first air valve 44, and the first air duct 43, back to first air blower 49. The heated or cooled system air passing over the inner side of interior wall plate 29, coated with seal coating 35, will heat or cool that interior wall surface, providing heating or cooling by radiant heat transfer and convection heat transfer between those wall surfaces and the interior of the habitable structure 1 and its contents and occupants.

The system air is circulated in this manner for short periods of time, at controlled flow rates, sufficient to bring the temperatures of the interior surfaces of the energy storage walls to levels high enough or low enough to effect the desired heating or cooling of the interiors of the habitable structures and the contents and occupants thereof, and to maintain acceptable comfort levels in the habitable structures 1.

Generally, sufficient energy should be stored within the energy storage medium to provide the heating or cooling required until the next time the intermittently available electric energy is available for use in the air heating or cooling and energy storage mode. Only a small excess of energy should be stored, to the extent that this is practical. This will assure minimum losses of energy as heat or cold from the energy storage medium to the outside environment. Measuring the temperatures of return air in air duct 48, during operation in the energy storage mode, can provide a reliable means for determining the quantity of energy, as heat or cold, which has been stored in the energy storage medium.

Data provided from operating experience and rear-term weather forecasts, will soon enable users to determine the minimum levels of stored energy which will suffice for anticipated breather conditions. Electric energy derived from wind power and solar energy are not only intermittent, but are also unpredictable in different ways. Caution should be exercised in planning to use these energy sources with the devices and methods of the present invention. Generally, some means for supplementing these forms of energy will be required. They may preferably be used just to replace a portion of the off-peak electric energy otherwise required from the utility company source.

In moderate climates, the optimum temperatures for the energy storage medium, during the heating mode, should normally not exceed one-hundred to one-hundred and ten degrees Fahrenheit, being toward the higher end of this range when the lower ambient temperatures are anticipated. The optimum temperatures for the energy storage medium during the cooling mode, should not normally be lower than fifty to sixty degrees Fahrenheit, being toward the lower end of this range when the highest ambient temperatures are to be expected.

If the temperatures inside the habitable structures become too high during the heating cycle of energy storage operations, or too low during the cooling cycle of energy storage operations, the air heating and cooling equipment is shut off for a short period of time, and the air blower is also shut off, stopping the flow of system air. The interior temperatures will soon return to desired control levels. Heating or cooling of system air and energy storage, as heat or cold, is then resumed, if further storage of energy is desired.

In operating with off-peak electric energy, the rate structures will generally permit operating, in the air heating or cooling and energy storage mode of operation, during off-peak hours which last from twelve to sixteen hours on the control days; during months or weeks defined as the peaking periods by utility companies. In these cases, only minimum amounts of energy, as heat or cold, should be stored. Experience will soon allow determining how high or low the temperatures of the energy storage medium should be taken to suffice until the beginning of the next off-peak period, when system air heating or cooling and energy storage can be resumed.

Optimum benefits for the utility companies can be achieved by controlling the time of use of the energy generation period during the off-peak hours, and during the entire year, and allowing utility load management personnel to select the time of day or night that the system air heating or cooling and energy storage is to be performed for each of the structures of this type served by their system.

During most of days of the Spring and Fall seasons, no heating or cooling will be required for such habitable structures, since there is a substantial amount of built-in "passive flywheel effect" provided by the mass of the energy storage medium inside the energy storage walls. Also, at times during such low energy requirement periods, the means for circulating system air can be used to improve on the passive flywheel effect, thus providing what is called the "enhanced flywheel effect". Natural energy received as heat of cold in the outer portions of the energy storage medium, may then be moved further inward, within the energy storage walls, to gain beneficial increases in the heating or cooling capacity thereof. When the use of the enhanced flywheel effect is no longer sufficient to maintain desired comfort levels within the structures, then the system air heating or cooling and energy storage mode of operation should be initiated, and followed by use of the space heating or cooling mode of operation, as needed.

In other embodiments, large habitable structures and multi-floor structures can be provided, and internal energy storage walls may also be used for additional energy storage, as required or desirable. Also, in other embodiments, fire resistant roofs, windows and doors may be used to allow providing firestorm-proof habitable structures, for areas which may be expected to lose homes from fires initiated from the outside by fire-storms, or by burning of nearby structures.

In other embodiments, reversible positive-displacement blowers called BiRotor blowers, can be used instead of conventional blowers. Reversing of the direction of rotation of the BiRotor blowers also reverses the direction of flow of air passed therethrough. Variable speed drives and BiRotor blowers allow more precise control of air pressures and mass flow rates, than is possible with conventional air blowers, and considerably less energy will be required for driving the BiRotor blowers, especially for Variable throughput applications.

Although this invention has been described with a certain degree of particularity, it is understood that the present disclosures are made only by way of example, and as preferred embodiments, and that numerous changes in the details of construction and the combination and arrangement of parts may be resorted to without departing from the spirit and the scope of the invention, reference being had for the latter purpose to the appended claims.

What is claimed is:

1. Devices for utilization of intermittently available electric energy and effecting energy production, storage, retrieval and use for maintaining comfortable temperatures inside habitable structures, said devices comprising:

a habitable structure having thick exterior energy storage walls for storing energy, as heat or cold, within an energy storage medium of permeable concrete and energy storage gravel contained within central portions of individual wall segments of said energy storage walls and allowing retrieval of said energy, as said heat or said cold, from said energy storage medium as it is needed, electrical air heating and air cooling equipment for use in heating or cooling of system air which serves as the heat transfer medium, air blowers for pressurizing said system air, air ducts and air valves for moving said system air through said heating and cooling equipment, said air ducts, said air blowers, said air valves, and said energy storage medium, allowing control of the direction of flow of said system air and its pressures and velocities, as said system air is moved in closed-circuit for storing said energy as said heat or said cold, and for retrieving and using said energy as said heat or said cold, for maintaining control of the temperatures inside said habitable structures, energy storage blocks made of said permeable concrete, forming said energy storage walls, said energy storage blocks having physical dimensions including a width (equal to the thickness of said energy storage wall), a height, and a length (equal to the length occupied by said energy storage block in said energy storage wall), said energy storage blocks have parallel end plates, the width thereof defining the thickness of said energy storage walls, said energy storage blocks have parallel side plates, the length thereof defining the length along the wall occupied by said energy storage blocks, (the terms conform to the accepted manner of showing concrete block dimensions as width, height and length, in that order), said energy storage blocks also having parallel tops and bottoms which are planar (or flat), within reasonable tolerance to facilitate stacking, said energy storage blocks have internal webs, at right angles to said end plates, and forming two pairs of in-line air slots, just inside each of said side plates, the innermost of said internal webs separate the innermost of said air slots from storage compartments in the central portion of said energy storage blocks, said storage compartments are separated from one another by a central web, said storage compartments are filled with clean, sized, energy storage gravel, after being installed in said energy storage wall of said habitable structure, said energy storage gravel and said permeable concrete of said energy storage blocks comprising said energy storage medium, for storing energy as said heat or said cold, and allowing the retrieval and use of said heat or said cold, said energy storage walls of said habitable structures comprised of wall segments, which extend from a foundation below to a cap beam above, and extend between openings for doors and windows and between openings for said doors or said windows and corner columns, which are fitted against the ends of two of said wall segments at each corner of said habitable structure, said wall segments contain four planar arrays of said pairs of said air slots, said planar arrays extending from said foundation below to said cap beam above, being in a plane extending from end to end of each said wall segment, said planar arrays being denominated first, second, third and fourth air plenums, beginning with said first air plenum being nearest the interior wall plate of said energy storage wall, and said fourth air plenum being nearest the exterior wall plate of said energy storage wall, all of said air plenums being closed by said foundation at their bottom, by said cap beam above, and by the end plates of said energy storage blocks at both ends of said wall segments, said fourth air plenum being used as a dead air-space insulation, to reduce the movement of said heat or said cold to the outside environment, said interior wall plates and said exterior wall plates are formed by said side plates of said energy storage blocks, one or more layers of stucco or mortar cement and an outer layer of fibrous mastic cement coating form a seal coating for all exposed surfaces of said permeable concrete of each said wall segment, said seal coatings extend upward onto the sides of said cap beams at the top, outward onto ledges of said foundation at the bottom, across end faces of said wall segments, and outward underneath said cap beams in said window openings and said door openings, to form a sealed system and to minimize or prevent the escape of said system air, confining the movement of said system air to air manifold tubes and air inlet/outlet tubes inside said cap beams, and also preventing the intake of ambient air into said system air, when the pressures of said system air are low, at some points within the closed-circuit air handling system, said system air being forced by pressure differentials to flow horizontally through said energy storage medium to store said energy as heat or cold and to retrieve said energy as heat of cold, when needed to control temperatures inside said habitable structure, said cap beams are made of impermeable concrete, and one or more said cap beams extend the length of each said energy storage wall of said habitable structure, said cap beams support and anchor the roof structure, from the tops of said energy storage walls, bridge over said door openings and said window openings, and have longitudinal air channels on the bottom thereof, which match up with said first, said second and said third air plenums in said energy storage walls, said energy storage walls having said storage compartments therein, said cap beams containing a first said air manifold tube positioned between the interior side of said cap beam and the longitudinal centerline of said cap beam, a second said air manifold tube at or near the center of said cap beam, and a third said air manifold tube positioned between the center of said cap beam and the exterior side of said cap beam, the three said air mainfold tubes are positioned with their centerlines on or near a horizontal plane on or near the center of said cap beam, the bottom side of each said cap beam having first, second and third narrow longitudinal air channels, each of said first, second and third air channels being connected with the respectively numbered said air plenum, each of said first, second and third air channels being connected at frequent intervals with respectively numbered said air manifold tubes by spiles (small tubes), to insure that uniform air pressures exist in said air plenums at points along the length of said cap beam, with first, second, and third said air inlet/outlet tubes being connected to respectively numbered said air manifold tubes and located near the longitudinal center of said cap beams, extending upward, allowing their connection to said air ducts above said cap beams, said first air inlet/outlet tubes contain first air valves and said second air inlet/outlet tubes contain second air valves, said first air inlet/outlet tubes and said second air inlet/outlet tubes are connected with first said air ducts, said third air inlet/outlet tubes are connected with second said air ducts, said energy storage walls are capped by one or more of said cap beams, the ends of said air manifold tubes extend a short distance beyond the ends of said cap beams, to match up with said air manifold tubes of adjacent said cap beams, and to provide a gap between ends of said cap beams, and between ends of said cap beams and corner cap blocks located above corner columns at the corners of said habitable structure, the spaces left between said cap beams by joining the ends of said air manifold tubes, and the spaces between said cap beams and said corner cap blocks effected by extension of the ends of said air manifold tubes, are filled with impermeable concrete mortar to form airtight seals and to maintain the alignment of said cap beams in said energy storage walls, one tension rod extends the full length of each of said energy storage walls, and is passed through said second air manifold tube, which is nearest the center of said cap beam, and through small holes in the ends of said second air manifold tubes of said in-line cap beams, and through horizontal holes near the centers of said corner cap blocks, said tension rods are tightened to provide compressive stress in said cap beams, and to bind the tops of said energy storage walls firmly at all the corners of said habitable structures, ends of said first and said third air manifold tubes, which fit against said corner cap blocks, being plugged to prevent air passage, two said air blowers, oriented to move air in opposite directions, being used to allow reversing the flow of said system air, thereby eliminating the need for flow-reversing valves and ducts for this purpose, variable-speed blower drive motors may be used to allow for better control of pressures and flow rates of said system air, the slab floor of impermeable, reinforced concrete is separated from said foundation by concrete expansion-joint material, ceiling joists and rafters of steel are supported by and fastened to said cap beams, and insulating materials may be installed between said ceiling joists, insulating materials are used on the outer surfaces of said energy storage walls, and contained between steel framing members, to minimize energy losses to the outside environment, and wall covering (siding), of any selected type or style may be used to complete the construction of said habitable structure, with multiple-pane thermal windows also being used to minimize energy losses.

2. The devices of claim 1, wherein the dimensions of full-size energy storage blocks are about twenty-four inches in width (which defines the thickness of said energy storage walls), and seven and seven-eighths inches in height (as are conventional concrete blocks), and sixteen inches in length (which is the length along the wall occupied by said full-size energy storage blocks), said dimensions being selected to facilitate the production of one of said energy storage blocks on each of the metal pallets used in conventional three-block concrete block manufacturing machines, which are designed for producing three standard eight-inch wide, seven and seven-eighths inch high, and sixteen inch long standard concrete blocks on each said metal pallet, each of said full-size energy storage blocks having a longitudinal, vertical central divider spanning across the longest dimension of said full-size energy storage block and connecting the opposite said side plates, said internal webs being at right angles to said central divider, two of said storage compartments being located on each side of said central divider in said central portion of said full-size energy storage blocks, two of said storage compart- ments on each side of said central divider being separated from one another by said central web, half-size energy storage blocks also having dimensions of width, height, and length, the length being one-half the length of said full-size energy storage blocks, are used during construction of said energy storage walls to facilitate the lapping half-way of said full-size energy storage blocks, in order to match said air slots and and said storage compartments in the successive layers of said energy storage blocks at the ends of the successive layers, and to provide improved structural strength, and also provide resistance to cracking of said seal coating on the surfaces of said wall segments of said energy storage walls of said habitable structure.

3. The devices of claim 2, wherein said roof structure is made with steel plate beams bolted down to the tops of said cap beams near the outer corner thereof, for providing transverse beam strength to said energy storage walls, and with steel rafters fastened thereto and spanning the entire distance to a steel crown beam, or to steel hip rafters, said rafters support steel hats on the upper side, and sheathing is installed on said steel hats, shingles or roofing tile is installed on said sheathing, insulation is installed between said rafters, eliminating the need for an attic, selected panelling is installed on steel furring attached to the bottom of said rafters, ceiling joists, ceilings and floors are provided above some interior rooms to provide space required for said air ducts, said air blowers; and said air heating and cooling equipment, thus allowing cathedral type ceilings to be used in portions of said habitable structures, as desired.

4. The devices of claim 2, wherein fireproof materials are used for construction of the roofing, and firestorm-proof said habitable structures are provided for areas where loss of homes and other said habitable structures can be expected from fires ignited by firestorms or from the burning of nearby buildings.

5. The devices of claim 2, wherein large, complex said habitable structures are provided, and multi-floor said habitable structures having cap beams on successive floors are provided.

6. The devices of claim 2, wherein said energy storage walls are used as internal walls within said habitable structures, to provide additional energy storage capacity therefor, as may be desirable in extremely cold climates.

7. The devices of claim 2 wherein said energy storage walls are provided for use in other types of structures, with said energy storage walls being constructed inside said other types of structure, to provide or assist in the heating or cooling thereof.

8. The devices of claim 2, wherein said foundations supporting said energy storage walls are supported from beneath by basement walls, or by piers or piling, said foundations serve as support for floor joists, and conventional flooring is used to conform to local and other applicable building codes.

9. The devices of claim 2, wherein said energy storage gravel, used as energy storage medium, is smaller than about three-eighths inch top-size, and larger than about one-sixteenth inch bottom-size, to provide sufficiently large ratios of surface area to mass, to effect sufficiently fast heat transfer, to or from said gravel, with only minimum temperature differentials of said system air, and to be more consistent with air flow resistance of said permeable concrete of said energy storage blocks, thus providing more uniform flow of said system air through said energy storage medium.

10. The devices of claim 1, wherein said roof structure is made with steel plate beams bolted down to the tops of said cap beams near the outer corner thereof, for providing transverse beam strength for said energy storage walls, and with steel rafters fastened thereto and spanning the entire distance to a steel crown beam, or to steel hip rafters, said rafters support steel hats on the upper side and sheathing is installed thereupon, shingles or roofing tile installed on said sheathing, and insulation is installed between said rafters, eliminating the need for attics, selected panelling is installed on steel furring attached to the bottom of said rafters, ceiling joists, ceilings and floors are provided above some interior rooms providing space required for said air ducts, said air blowers, and said air heating and cooling equipment, thus allowing cathedral type ceilings to be used in portions of said habitable structures, as desired.

11. The devices of claim 1, wherein fireproof materials are used for construction of the roofing, and firestorm-proof said habitable structures are provided for areas where loss of homes and other said habitable structures can be expected from fires ignited by firestorms or from the burning of nearby buildings.

12. The devices of claim 1, wherein large, complex said habitable structures are provided, and said multi-floor habitable structures having cap beams on successive floors are provided.

13. The devices of claim 1, wherein said energy storage walls are used as internal walls within said habitable structures, to provide additional energy storage capacity therefor, as may be desirable in extremely cold climates.

14. The devices of claim 1, wherein said energy storage walls are provided for use in other types of structures, with said energy storage walls being constructed inside said other types of structure, to provide or assist in the heating or cooling thereof.

15. The devices of claim 1, wherein said foundations supporting said energy storage walls are supported from beneath by basement walls, or by piers or piling, said foundations serve as support for floor joists, and conventional flooring is used to conform to local and other applicable building codes.

16. The devices of claim 1, wherein said energy storage gravel, used as energy storage medium, is smaller than about three-eights inch top-size, and larger than about one-sixteenth inch bottom-size, to provide sufficiently large ratios of surface area to mass, to effect sufficiently fast heat transfer, to or from said gravel, with only minimum temperature differentials of said system air, and to be more consistent with air flow resistance of said permeable concrete of said energy storage blocks, thus providing more uniform flow of said system air through said energy storage medium.

17. Methods for effectively utilizing internmittently available electric energy, said intermittently available electric energy being used to provide the heating or cooling of system air for use as a heat transfer medium for effecting storage of energy in an energy storage medium within energy storage walls of habitable structures, by the heating or cooling of said system air and said energy storage medium, while said intermittently available electric energy is available, and said system air being used to heat or cool said energy storage medium as it passes horizontally outward through said energy storage medium while being moved in closed-circuit through electrically energized air heating or cooling equipment and through said energy storage medium, effecting the storage therein of said energy, as heat or cold, in segments of said energy storage walls, said heat or cold later being retrieved and used for heating or cooling of interior wall surfaces of said habitable structure by reversing the flow of said system air, while said heating or cooling equipment is not in use, comprising the steps of:

providing said habitable structure having thick exterior said energy storage walls for storing energy, as heat or cold, within said energy storage medium of permeable concrete and energy storage gravel, said energy storage gravel being contained within central portions of individual wall segments of said energy storage walls, to allow the retrieval of said energy, as said heat or said cold, from said energy storage medium as needed, said air heating and air cooling equipment being used for said heating or cooling of said system air, serving as the heat transfer medium, air blowers for pressurizing said system air, air ducts and air valves for moving said system air through said air heating and air cooling equipment, with said air blowers, said air valves, said air ducts, and said energy storage medium permitting the control of direction of flow of said system air and its pressures and velocities, as said system air is moved in said closed-circuit for storing said energy, as said heat or said cold, and for retrieving and using said energy as said heat or said cold for controlling the temperatures inside said habitable structures, providing energy storage blocks made of said permeable concrete for forming said energy storage walls, said energy storage blocks having dimensions including a width (equal to the thickness of said energy storage wall), a height, and a length (being equal to length occupied by said energy storage block in said energy storage wall), said energy storage blocks have two parallel end plates, the width thereof defining the thickness of said energy storage walls, said energy storage blocks having two parallel side plates, the length thereof defining length along said energy storage wall occupied by said energy storage block (the terms conform to the industry accepted manner of showing block dimensions as width, height, and length in that order), said energy storage blocks have internal webs at right angles to said end plates and forming two pairs of in-line air slots, just inside each said side plate, the innermost of said internal webs separate the innermost of said air slots from storage compartments in central portions of said energy storage blocks, said storage compartments are separated from one another by a central web, and are filled with clean, sized said energy storage gravel, after said energy storage blocks have been installed in said wall segments of said energy storage walls of said habitable structure, said energy storage gravel and said permeable concrete of said energy storage blocks comprising said energy storage medium, for storing said energy as said heat or said cold, providing said wall segments to make said energy storage walls of said habitable structure, said wall segments extend between door openings and window openings, and between said door openings and said window openings and corner columns, which are fitted against the end faces of two of said wall segments, at each corner of said habitable structure, said wall segments containing four planar arrays of said pairs of air slots, said planar arrays extending from a foundation below to a cap beam above, being in a plane extending from end to end of said wall segment, said arrays denominated first, second, third and fourth air plemums, beginning with said first air plenum nearest the interior wall plate of said energy storage wall, and said fourth air plenum nearest the exterior wall plate of said energy storage wall, said air plenums being closed by said foundation at the bottom, by said cap beam above, and on its ends by the end plates of said energy storage blocks at the ends of said wall segments, said fourth air plenum being used as air-space insulation for reducing the loss of said energy to the outside environment, said interior wall plates and said exterior wall plates are formed by said side plates of said energy storage blocks, providing one or more layers of stucco or mortar cement and an outer layer of fibrous mastic cement coating which forms a seal coating for all exposed areas of said permeable concrete of said energy storage blocks of said wall segments of said energy storage walls of said habitable structure, said seal coatings extend upward onto the sides of said cap beams; outward under the bottoms of said cap beams in all said window openings and said door openings, and outward onto ledges of said foundation at the bottom, to prevent or minimize the escape of said system air, except through said cap beams and selected air inlet/outlet tubes therein, and to prevent the intake of ambient air into said system where pressures of said system air are low, providing said cap beams of impermeable concrete, with one or more of said cap beams extending the length of each of said energy storage walls, of said habitable structure, said cap beams support and anchor a roof structure from the top of each said energy storage wall, bridge over said window and said door openings, have parallel, longitudinal air channels on the bottom thereof, which match up with said air slots and said storage compartments in said energy storage blocks thereunder, said cap beams each contain a first air manifold tube positioned between the interior side of said cap beam and the longitudinal centerline of said cap beam, a second air manifold tube at or near the center of said cap beam, and a third air manifold tube positioned between the center of said cap beam and the exterior side of said cap beam, the three said air manifold tubes being positioned with their centerlines on or near a horizontal plane at or near the center of said cap beam, providing that the bottom side of each said cap beam has first, second, and third narrow longitudinal air channels, each said first, second, and third air channel being connected with the respectively numbered said air plenums, each said first, second, and third air channel being also connected at frequent intervals with respectively numbered said air manifold tubes by spiles (small tubes), to insure that uniform air pressures exist in said air plenums at points along the length of said cap beam, said first, second and third air inlet/outlet tubes are connected to respectively numbered air manifold tubes, located near the longitudinal center of said cap beams, and extending upward allowing their connection to said air ducts above said cap beams, said first air inlet/outlet tubes contain first air valves and said second air inlet/outlet tubes contain second air valves, said first air inlet/outlet tubes and said second air inlet/outlet tubes are both connected to first said air ducts, said third air inlet/outlet tubes are connected to second said air ducts, and have no air valve therein, providing that said energy storage walls are capped by one or more said cap beams, the ends of said air manifold tubes extend a short distance beyond the ends of said cap beams, to match up with said air manifold tubes of adjacent said cap beams, and to provide a gap between the ends of adjacent said cap beams, and between the ends of said cap beans and corner cap blocks located above corner columns at the corners of said habitable structures the spaces left between said cap beams by matching the ends of said air manifold tubes, and the spaces left between said cap beams and said corner cap blocks caused by the extension of said air manifold tubes therefrom, are filled with impermeable mortar cement to form air-tight seals and to maintain alignment of said cap beams in said energy shortage walls, operating in a first energy production and storage mode wherein system air is directed through said third air plenums, through said third air channels, said spiles, said third air manifold tubes, said third air inlet/outlet tubes, said second air duct, said second air blower (which moves said system air in this direction), said fourth air duct, said air heating and cooling equipment (wherein said system air is heated or cooled), said third air duct, said first air blower (which cannot be in operation in this first energy production and storage mode), said first air duct, said first air inlet/outlet tube, said first air valve, said first air manifold tube, said spiles, said air channels, into said first air plenum, where it heats the interior wall plates of the exterior energy storage walls of said habitable structure, while said system air is also moving horizontally outward through said energy storage medium (the permeable concrete of said energy storage blocks and said energy storage gravel), where energy is used to either heat or cool said energy storage medium, then into said third air plenum, where this description of said first energy production and storage mode began, said first energy production and storage mode being used when the need exists for heating or cooling the inside of said habitable structure while said energy is being produced and stored, operating in a second energy production and storage mode, when no heating or cooling is needed inside said habitable structure, and directing said system air through said third air plenums, said third air channels, said spiles, said third air manifold tubes, said third air inlet/outlet tubes, said second air duct, said second air blower (which moves said system air in this direction), said fourth air duct, said air heating and cooling equipment (wherein said system air is heated or cooled), said third air duct, said first air blower (which cannot be in operation in said second energy production and storage mode), said first air duct, said second air inlet/outlet tube, said second air valve, said second air manifold tube, said spiles, said air channels, into said second air plenum, horizontally outward through said energy storage medium (the permeable concrete of said energy storage blocks and said energy storage gravel), where energy is used to heat or cool said energy storage medium, then into said third air plenum, where the description of said second energy production and storage mode began, said second energy production and storage mode being used when there is no need for heating or cooling inside said habitable structure while said energy is being produced and stored, this said second energy production and storage mode and said first energy production and storage mode, as described in the paragraph immediately above, may be alternated as required to control temperatures inside said habitable structure, while energy is being produced and stored as heat or cold, operating in an energy recovery and heating or cooling mode, when heating or cooling is needed inside said habitable structure, wherein said first air blower is used, and said system air is moved from said first air plenum, through said first air channels, said spiles, said first air manifold tube, said first air inlet/outlet tube, said first air valve (said second air valve remains closed in this mode), said first air duct, said first air blower (positioned to move air in the opposite direction of said second air blower), said third air duct, said heating and cooling equipment (which is not in use in this mode), said fourth air duct, said second air blower (which is not in use in this mode), said second air duct, said third air inlet/outlet tube, said third air manifold tube, said spiles, said air channels, and into said third air plenum, said system air is moved horizontally inward through said energy storage medium, where said system air is heated or cooled, by said energy storage medium, then through said second air plenum (said second air valve being closed) and into said first air plenum, where said system air heats or cools said interior wall plate, which then heats or cools said interior, contents and occupants of said habitable structure by a combination of radiant and convection heat transfer, completing the heating or cooling cycle, the operation is continuous until the desired temperature, or comfort level, is reached inside said habitable structure, segregating said interiors of said habitable structures onto individual areas or rooms thereof, so that varying amounts of heat or cold may be provided as needed to maintain the desired temperatures in said areas or said rooms, this being accomplished by use of said air valves in said air inlet/outlet tubes connected to said first air manifold tubes and to said second air manifold tubes, when said first air valves in said first air inlet/outlet tubes and also said second air valves in said second air inlet/outlet tubes, are both closed, no said system air is circulated through said cap beams in which said valves are located, blocking air flow at both ends of said air manifold tubes within each of said cap beams, therefore if said air valves are closed, as is described above, no heat or cold is stored therein during said air heating and cooling and energy storage mode of operation, and no heat or cold is brought to said interior surfaces of said energy storage walls served by said cap beams, during the space heating or cooling mode of operation, different portions of said habitable structures may thus be kept at different temperature levels if this is desired, also different amounts of energy may be supplied to various portions of said habitable structures to maintain desired temperature levels, discontinuing operation of said heating and cooling equipment and the movement of said system air, used for converting electric energy to heat or cold for heating or cooling of said system air, whenever temperatures inside said habitable structures become too high during the heat storage mode, or too low during the cold storage mode, for a period of time, until interior temperatures again require heating or cooling, the operation then being resumed, opening said first air valves in said first air inlet/outlet tubes and closing said second air valves in said second air inlet/outlet tubes, wherein said system air then passes into said first air plenums instead of said second air plenums, before passing through said energy storage medium, whenever the temperatures inside said habitable structures become too low during the heat storage modes, or too high during the cold storage modes, said system air thus coming in contact with said interior wall plates and providing the needed increase in heating or cooling, when the interior temperature reaches the desired level, said first air valves and said second air valves are again returned to the original position, and the energy storage as heat or cold is resumed as before, the passive flywheel effect, which is great for said habitable structures, can now be supplemented by the methods described herein, providing the new "enhanced flywheel effect", wherein natural energy can be retrieved and stored, as heat or cold, in said energy storage medium, as the result of slow natural heat flows into or out of the outer portions of said energy storage walls, caused by outside air temperature variations and the effects of wind and rain on the heat transfer rates, wherein this heat or cold can be moved into the inner portions of said energy storage medium by use of the energy storage methods provided, said system air is pressurized by said first air blower moving said system air into said third air plenums and then horizontally inward through said energy storage medium, which can be heated or cooled somewhat thereby, this mode of operation is useful only for short periods of time when the outside temperatures are unusually high, for a short time, during the beating seasons, or when the outside temperatures are unusually low, for a short time, during the cooling season.

* * * * *